July 26, 1966 P. P. BIRINGER 3,263,148
STATIC FREQUENCY MULTIPLYING SYSTEM
Filed May 21, 1962 2 Sheets-Sheet 1
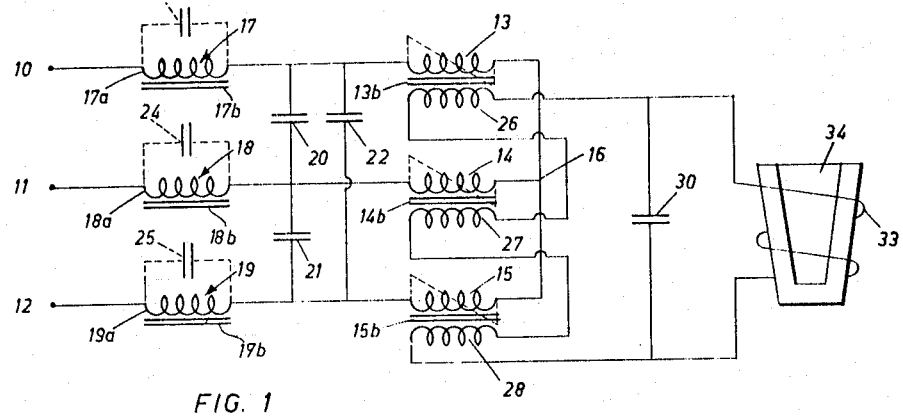
FIG. 1
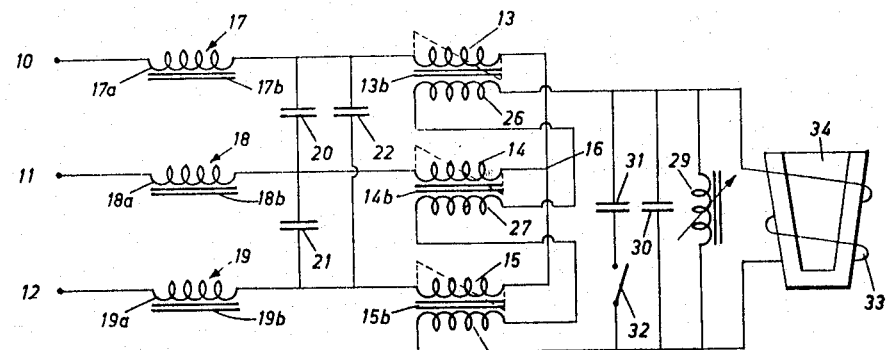
FIG. 2
LEGEND
NON-LINEAR
FIG. 3a
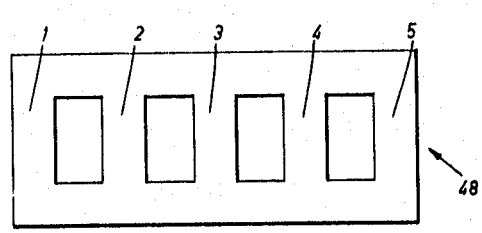
FIG. 3
INVENTOR.
PAUL P. BIRINGER
BY United States Patent Office 3,263,148
Patented July 26, 1966

3,263,148
STATIC FREQUENCY MULTIPLYING SYSTEM
Paul Peter Biringer, Toronto, Ontario, Canada, assignor to Ajax Magnethermic Corporation, Youngstown, Ohio, a corporation of Ohio
Filed May 21, 1962, Ser. No. 196,341
3 Claims. (Cl. 321—7)

This invention relates to a static frequency multiplying system.

As outlined in co-pending application of this applicant, Serial No. 725,004, filed March 31, 1958, of which this application is a continuation, which copending application issued as U.S. Letters Patent 3,040,231, dated June 19, 1962, previous attempts to provide single phase frequency multiplied output from a multiphase source such as a three phase source have been unsuccessful by reason of the substantial power factor correction required. Thus, for example, a single output winding on a common leg of a three phase Y core construction having three primary windings on separate core legs common to the central leg causes harmonics to be reflected into the source energizing the primary windings, thus the power factor cannot be corrected or compensated and a unity power factor cannot be obtained.

Having regard to the foregoing, it is the main object of the invention to provide a symmetrical power system adapted, for example, for use in energizing induction heating furnaces or like heavy load demands with an input power factor for the system very close to unity.

It is a further object of the invention to provide an induction heating power supply adapted to convert a multiphase low frequency source to a higher frequency single phase output and with a satisfactory power factor.

A further object of this invention is to achieve an improved means for stabilizing the circuit and maintaining symmetry in the circuit and to reduce the effect of variations in line voltage, thus avoiding undesirable resonance conditions, oscillations, etc., which adversely affect the operation of the unit, causing high power losses, creating high currents, resulting in erratic operation, and introducing unsymmetrical conditions.

With the foregoing and other objects in view the invention generally concerns a power supply system adapted to deliver single phase output electrical power with a power factor approaching unity, rich in harmonics and energizable by a multiphase source of electrical power of predetermined frequency, comprising essentially an inductance or primary structure for each phase of said source energizable by the latter having a current voltage relationship which is non-linear; a reactance having a current voltage relationship which is linear for each non-linear inductance disposed between the latter and the corresponding phase of said source serving to provide a high impedance path for harmonic components of said frequency reflected by said primary structure, said linear reactances thereby developing non-sinusoidal voltages between said linear reactances and said primary structures; condensers for providing a low impedance path for harmonic currents providing non-sinusoidal current to said primary structures, means whereby single phase high frequency power is symmetrically distributed with respect to said source, the relationship between the said low impedance means and the high impedance means being such that a substantial unity power factor is obtained, a symmetrical circuit results and stable operation is secured.

A still further object of my invention is to achieve a highly efficient system of static frequency multiplication in a practical form which is accepted by power companies as desirable because of its high factor and which can be manufactured in a commercial form to require a minimum of maintenance.

Other objects of the invention will be appreciated in more detail by reference to the following specification disclosing specific practical arrangements by way of illustration in conjunction with the accompanying drawings.

In the drawings:

FIGURE 1 is an electrical schematic view of a preferred power system for converting a multiphase power source to single phase high frequency power output for induction heating service;

FIGURE 2 is a modification of the system of FIGURE 1;

FIGURE 3 is a diagrammatic illustration of a core construction usable in the power supply system of the invention;

FIGURE 3a is a legend indicating the non-linear elements of FIGURES 1 and 2;

Figure 4:
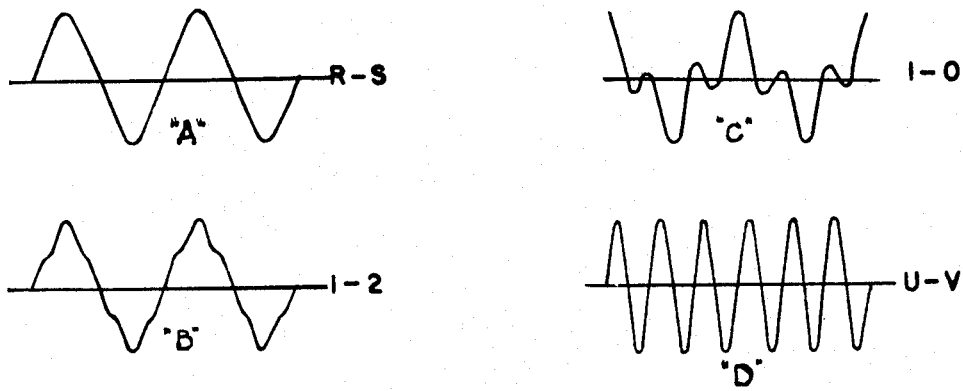
FIGURE 4 is a group of oscillograms illustrating the various wave forms of voltage and current as measured at various points along the circuit.

The system of the invention is shown in several suitable forms in FIGURES 1 and 2. In both figures a multiphase source, such as a three phase source, of alternating current delivered from terminals 10, 11 and 12 energizes current dependent inductances, i.e., primaries in 13, 14 and 15 connected in star relation to a star connection point 16. The current dependent inductances or primaries are separated from the source terminals 10, 11 and 12 by reactances 17, 18 and 19 for the current which reactances may be provided in the form of chokes, having an air gap (not shown) and windings 12a, 18a and 19a, the latter serving to connect the respective primaries to its respective source and serving also to isolate the source from harmonic currents reflected by the primaries. Condensers 20, 21 and 22 are effectively connected to the primaries either in Y or delta form and as shown are delta connected. These condensers are supplied with non-sinusoidal voltage developed phase to phase between the linear reactances and the non-linear primaries. The reactances are, as described, linear in the sense in which these are linear throughout the operating range of the system, i.e., the ratio of the voltage current relationship at the fundamental frequency is constant in such range. This operating range varies according to the specific power requirement and is predetermined by design. It is predetermined by utilizing a certain predetermined relationship at the fundamental frequency is constant in such range. This operating range varies according to the specific power requirement and is predetermined by design. It is predetermined by utilizing a certain predetermined relationship between the ohmic value of the capacitive reactance $X_C$ and the inductive reactance $X_L$ of the linear choke at fundamental frequency.

For example, if the power was supplied at 460 volts three phase 60 cycle frequency and the power requirement is 100 kw., this would mean that a selected 1 ohm value for $X_C$ would require a corresponding $X_L$ of between .04 and 0.25 ohm and preferably in the order of about 0.2 ohm and for variations in power voltage and frequency requirements $X_C$ and $X_L$ would be correspondingly adjusted. These values are considered to be basic limits determining the operating range for the following reasons:

In a three phase symmetrical system of the type used in this example, fifth harmonic currents are always present. I have found that when the $X_L/X_C$ ratio approaches .04, the circuit will tend to resonate at the fifth harmonic frequency causing unbalance, high currents, etc., as described hereinbefore. I have also found that when the $X_L/X_C$ ratio approaches 0.25 a second harmonic resonance can occur due to minor variations in the line voltage, or structural defects, or unsymmetry caused by the hysteresis loop of the magnetic materials of the primary, which can introduce sufficient unsymmetry to permit the self-propagating second harmonic resonant condition referred to above. This will develop only at the upper limit of such range as a similar resonance develops for the fifth harmonic at the lower limit of the range and a satisfactory non-resonant operation may be secured. I have found in the example given that it is preferable to operate within the range close to the upper limit, such as at 0.2, where the unit appears to be least sensitive to variations in line voltage and less harmonics are reflected back to the source.

It will be understood that the reactances are not necessarily separate structures but the relationship established hereby applies wherever a reactance is electrically effective to function in the manner hereinbefore described however said reactance is introduced between the capacitors and the source.

Each of the cores of the reactances 17, 18 and 19 and inductances 13, 14 and 15 designated by b consists of a magnetic material such as laminated iron. While the cores are shown schematically it will be understood that any core in the form of E–I laminations, C-cores or other conventional arrangement will be suitable for the purposes of the invention. Each of the cores as illustrated carries one winding and is designed in the case where cores such as 17b, 18b and 19b are used to provide a linear reactance for the supply current. The linearity is achieved preferably by providing an air gap in the magnetic circuit of each core; this preferred technique is known. In accordance with known design technique the dimensions of the required air gap will depend upon the current range of the linear reactances.

The cores 13b, 14b and 15b are designed to operate in the non-linear part of their B–H characteristic. Operation within this range requires high magnetizing currents supplied by the condensers 20, 21 and 22 described. The single phase output windings 26, 27 and 28 are connected electrically in series in the form shown and are magnetically coupled to their respective non-linear inductance primary windings 13, 14 and 15 by cores 13b, 14b and 15b. It will be observed that it is not essential to the operation of the system that secondary windings such as 26, 27 and 28, be employed and it will be apparent to those skilled in the art to which the invention appertains that arrangements, such as those shown in FIGURES 2, 5 and 6 of co-pending application of this same applicant referred to hereinabove, could be utilized to deliver the desired multiplied frequency output from the primaries.

In FIGURE 2 a modification of the system disclosed in FIGURE 1 will be evident in that voltage regulation is accomplished in the output circuit by providing a variable reactor 29 connected in parallel with condenser 30, which latter condenser may be paralleled with a further condenser 31 controlled by a manual switch 32 for effecting power factor correction on the output.

In FIGURE 3 a preferred form of core construction 48 is illustrated. Three of the five core legs carry the primary windings 13, 14 and 15 and the remaining two core legs are adapted to carry the output or secondary windings.

It is desired to point out that the linear reactances 17, 18 and 19, while disclosed in the form of linear inductances of predetermined inductance are capable of being replaced by conventional saturable reactors. Ordinarily a saturable reactor is regarded as a non-linear reactance because of the non-linear nature of the core material utilized therefor. It is important to this invention that the true nature of a saturable reactor be understood in the operative sense. A saturable reactor may be employed according to this invention if it operates as a linear reactance within the operating range. Accordingly, saturable reactors may replace the linear reactances 17, 18 and 19 effectively as adjustable linear reactances whereby the power output of the system disclosed herein may be controlled to selectable operating levels.

Aside from the advantages of the power supply system which will be evident to skilled persons, it will be apparent that the input power factor of the power supply system of the invention is very close to unity, that is in excess of 0.9. This result obtains because the excitation current for the non-linear inductances or primaries is obtained from excitation condensers charged by the voltage developed between the linear reactances and non-linear inductances, these voltages being distorted in the same manner as the excitation current of the non-linear inductances or primaries.

In FIGURE 4 a group of oscillograms of voltage and current, as measured at various points in the circuit of this invention, are shown. In FIGURE 4 at a is illustrated the sinusoidal wave of the supply voltage and substantially sinusoidal wave of the supply current, which as shown, are in phase relationship. In FIGURE 4 at b is illustrated the now distorted voltage across the condensers and the corresponding current through the condensers and the corresponding current through the condensers which it will be noted are out of phase but are of the continuous symmetrical form. In FIGURE 4 at c is illustrated the voltage across the primaries and the current through them. It will be noted that the voltage and current waves illustrated are still of continuous symmetrical form and out of phase. In FIGURE 4 at d is illustrated the output voltage and current which is of continuous symmetrical form and substantially sinusoidal and of multiplied frequency as determined by the design of the system and except for the difference in the frequency is of substantially the same wave form as at the source.

Figure 5:
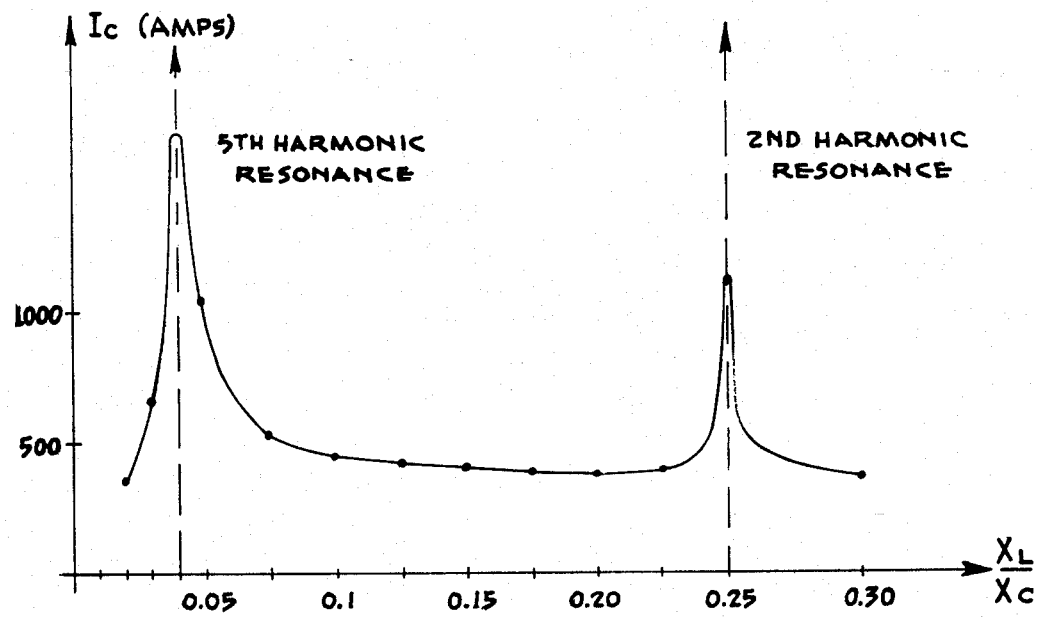
FIGURE 5 is a graph showing the current in the condenser as af unction of the $X_L/X_C$ ratio taking into consideration normal circuit parameters and harmonic contents.

In FIGURE 5 I have shown a graph which illustrates the relationship between the capacitor current which is a function of capacitor reactance and the ratio of $X_L/X_C$ for normal circuit parameters and harmonics. The particular graph shown is based on a three phase system.

The numerical limits referred to in the example given appear in the ordinate of the chart and it will be evident from the showing that when approaching either of the stated lower or upper limits, .04 or 0.25, the capacitor currents reach dangerously high levels due to resonance of either second or fifth harmonic currents.

Hence, it will be observed that a symmetrical balanced system is achieved which delivers a single phase power to the load from a balanced multi-phase source, the system operating throughout with a voltage and current wave form which is continuous and symmetrical about a neutral axis. It will also be observed that this system achieves substantially unity power factor at the source and a fixed ratio of multiplication.

While I have described this invention in connection with preferred embodiments, I am aware that numerous and extensive departures may be made therefrom without, however, departing from the spirit of my invention and the scope of the appended claims.

I claim:

1. In a multiphase system, a source of low frequency current, a primary structure for each phase of said source energizable by the latter having a current voltage relationship which is non-linear, a reactance having a current voltage relationship which is linear providing a high impedance path for harmonic components of said frequency reflected by each said primary structure, each reactance being electrically introduced between its respective primary and the source, a capacitance, each capacitance being electrically interposed between the separate primaries for providing a low impedance path for harmonic currents passing non-sinusoidal current to said primary structures, the relationship between inductive reactance and capacitive reactance as determined at the source frequency being maintained in the ratio of the ohmic values of $$\frac{X_L \text{ (inductive reactance)}}{X_C \text{ (capacitive reactance)}}$$

within specified numerical limits dependent upon the number of phases of the source resulting in a symmetrical circuit having voltage and current having throughout a continuous symmetric wave form.

2. In a three-phase system, a source of 60 cycle low frequency current, a primary structure for each phase of said source energizable by the latter having a current voltage relationship which is non-linear, a reactance having a current voltage relationship which is linear providing a high impedance path for harmonic components of said frequency reflected by each said primary structure, each reactance being introduced between its respective primary and the source, a capacitance, each capacitance being electrically interposed between the separate primaries for providing a low impedance path for harmonic currents passing non-sinusoidal current to said primary structure, the relationship between the inductive reactance and the capacitive reactance being in the ratio of the ohmic values of $$\frac{X_L \text{ (inductive reactance)}}{X_C \text{ (capacitive reactance)}}$$

within specified numerical limits of .04 and 0.25, means delivering a single phase tripling frequency in a symmetrical circuit.

3. In a multiphase system, a source of low frequency current, a primary structure for each phase of said source energizable by the latter having a current voltage relationship which is non-linear, a reactance having a current voltage relationship which is linear providing a high impedance path for harmonic components of said frequency reflected by each said primary structure, each reactance being electrically introduced between its respective primary and the source, a capacitance, each capacitance being electrically interposed between the separate primaries for providing a low impedance path for harmonic currents passing non-sinusoidal current to said primary structures, the relationship between inductive reactance and capacitive reactance as determined at the source frequency being maintained in the ratio of the ohmic values of $$\frac{X_L \text{(inductive reactance)}}{X_C \text{ (capacitive reactance)}}$$

within specified numerical limits, dependent upon the number of phases of the sources resulting in a symmetrical circuit, the said reactances being maintained within the stated relationship eliminating resonance at the second harmonic current and eliminating resonance at the first odd harmonic current characteristic of the number of phases which would appear at the source.

References Cited by the Examiner

UNITED STATES PATENTS 3,040,231   6/1962   Biringer _____ 321—69

JOHN F. COUCH, *Primary Examiner.*

LLOYD McCOLLUM, *Examiner.*

G. J. BUDOCK, G. GOLDBERG, *Assistant Examiners.*